J. M. RICHARDS.
MILLING CUTTER.
APPLICATION FILED APR. 23, 1917.
1,345,636.
Patented July 6, 1920.
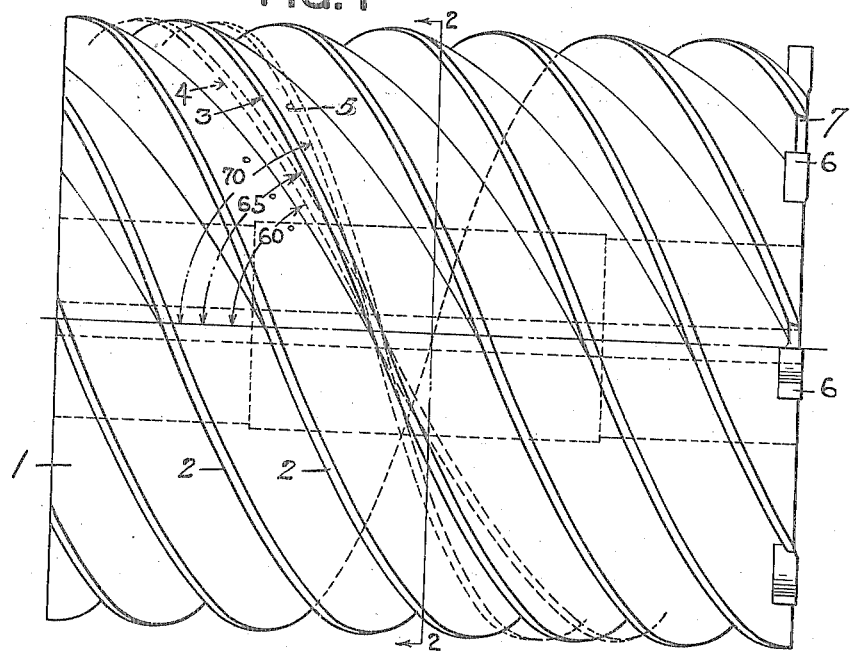
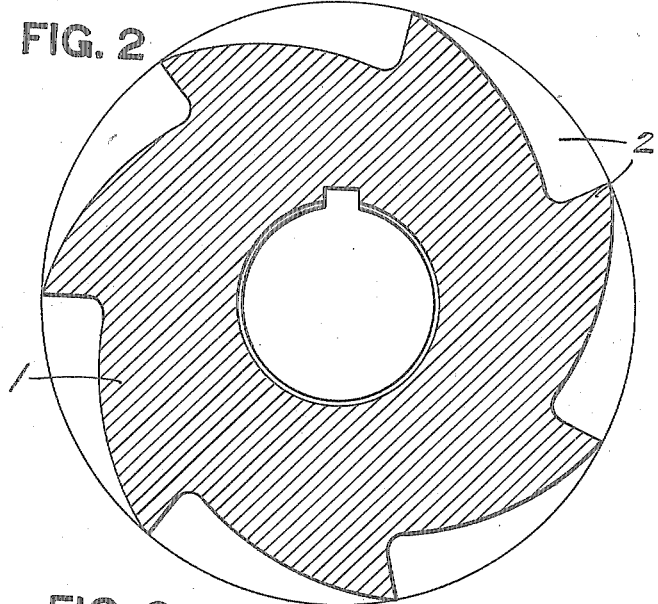
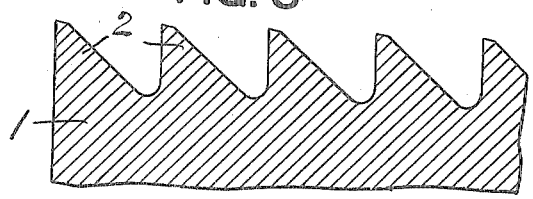
INVENTOR
John M. Richards
By Kay Totten Powell
Attys

UNITED STATES PATENT OFFICE.

JOHN M. RICHARDS, OF BEAVER FALLS, PENNSYLVANIA.

MILLING-CUTTER.

1,345,636.            Specification of Letters Patent.        Patented July 6, 1920.

Application filed April 23, 1917.  Serial No. 163,939.

*To all whom it may concern:*

Be it known that I, JOHN M. RICHARDS, a citizen of the United States, and resident of Beaver Falls, in the county of Beaver and State of Pennsylvania, have invented a new and useful Improvement in Milling-Cutters; and I do hereby declare the following to be a full, clear, and exact description thereof.

My invention relates to cutting tools, and is particularly concerned with a rotary cutter which is primarily adapted for cutting or milling steel or any other metals, but it is to be understood that the uses of the cutter are not confined to the cutting of metal, as it may be used to advantage in work on fiberboard, hides, paper, hard rubber, or other close-grained substances.

One of the principal objects of my invention is to produce a tool of the general character described, which will perform a shearing cut on the material and which will eliminate chattering of the tool no matter at what speed the tool is rotated.

One of the reasons for this avoiding of chattering, as I have ascertained is that in my improved cutting tool, at least one cutting edge is constantly in contact with the work as distinguished from the action in a cutter where the teeth or cutting edges are substantially parallel or at a very slight axis to the cutter.

With these and other objects and advantages in view my rotary cutter is provided with one or a plurality of spirally arranged cutting edges. These cutting edges, as I have found by long experimentation must be arranged at a considerable angle to the axis of the cutter in order to secure the best results in obtaining a clean shearing cut, in preventing any possibility of chattering and in producing smooth and uniform work.

But a further and great advantage of this improved cutter resides in the fact that by actual trial it is found the cutter can be run at very much higher speed during the cutting operation due principally to the fact that there is considerably less friction between the cutter and the work in operating my device than in using a cutter of the ordinary construction. That is to say, with my improved cutter the action is a shearing cut, but it is more than this. The angle of the cutting edge to the axis of the cutter in my improved tool is sufficiently great to accentuate or emphasize the shearing action, as distinguished from a direct chipping action, such as results with cutters of ordinary construction. This angle of cutting edge to the axis of the cutter is what I term the "angular advance of the cutting edge", and this term will be understood to refer to that angle throughout the specification and claims. On the other hand, the angular advance of the cutting edge must not approach too close to a right angle to the axis. Obviously, if at a right angle to the axis of the cutter, the cutting edge would merely rub through the work and be worn dull. And again, though at a slight offset from a right angle to the axis, the cutting edge would then tend to drag through the work and become dull without performing any effective cutting operation.

From what has been said above, it is clear that the angular advance of the cutting edge must be confined within certain limits to get the best results. As is well known to those skilled in this art, a great number of factors enter into the designing and making of rotary cutters in general. The special factors which would enter into a rotary cutter having spirally arranged cutting edges to produce the best results are not obvious, but were only ascertained after exhaustive experimentation and after numerous failures in attempting to determine what are the essential features of the best form of rotary cutter of this kind. Experiments showed that the best results could not be obtained by making cutters of different diameters and with the same lead; nor are the best results necessarily secured with the same pitch of cutting edges. It was found, however, that the thing essential to making the cutter most effective, was this factor of angular advance, or the angle of the cutting edge to the axis of the cutter. Not only this, but it was found after long experiment that this angle of the cutting edge to the axis must be confined to certain more or less definite limits on either side of an angle which produced, as was found, the ideal or best results.

After experimenting with numerous different cutters of different diameters and of different leads and different angles of advance of the cutting edge, I have discovered that the ideal form of cutter is that in which the angle of the cutting edge to the axis of the cutter is approximately 65°. This angle may be varied to some extent, that is, it may be reduced or it may be enlarged, but for the best results in all sizes of cutters, it is found this angle should not greatly exceed 70° or be greatly less than 60°. It is emphasized, however, that approximately 65° is the ideal angular advance.

With a cutter the angular advance of whose edge is approximately 65°, it is found that there is less friction between the cutter and the work, the cutter may be operated at greatly increased speed, but even more important than this, the feed of the work is increased so that amount of work accomplished in a given time is very greatly increased, in some instances as much as 100 per cent.

Incidentally, it was discovered that by having the angular advance of the cutting edge practically or approximately 65°, all tendency of the cutter to lift the work out of the chuck was avoided. This is a common tendency with rotary cutters of ordinary construction.

A still further advantage results from the use of this improved form of cutter in that when the feed of the work is stopped while the cutter is in the work and revolving, rotary cutters of ordinary construction have a tendency to cut a deeper impression in the work at the point where the feed is stopped. This is due to the fact that while the work is being fed past the cutter the resistance of the material to the action of the cutter causes the cutter to spring away from the work, slightly, so that during the feed of the work the distance between the table and the cutter is slightly greater than when there is no work between the cutter and the table. Consequently, if the feed of the work beneath the cutter is stopped, the cutter has a tendency to return to its normal distance from the table and therefore produces an impression in the face of the work at the point where the feed of the work is stopped.

With the cutter of my improved construction, on the other hand, it is found that the cutting action is such that the cutter is not separated farther from the table during the feed of the work sufficiently to produce any perceptible effect when the feed is stopped and the cutter continues to revolve over a given part of the work.

With the above objects and advantages in view, the invention consists in a construction and arrangement of parts one preferred embodiment of which is shown in the accompanying drawings, in which Figure 1 is a side view of the cutter embodying my improvements; Fig. 2 is a transverse section thereof; and Fig. 3 is a fragmentary section taken parallel with the axis of the cutter, and showing the shape of the cutting edges.

In the embodiment of the invention herein selected for illustration, the cutter 1 is provided with a plurality of cutting edges 2. It will be noticed that in the preferred form of my invention we have multiple cutting edges, that is to say, the cutting edges are formed on several separate spirals passing around the axis of the cutter.

In order to emphasize the special angular advance which I have discovered to be the ideal construction, attention is called to the cutting edge designated 3.

This cutting edge, as well as the other cutting edges shown generally in Fig. 1 of the drawing, is arranged at an angle of 65° to the axis of the cutter. This angular advance, as above fully described, results in the greatest advantage in the cutting action. It avoids objections common to ordinary cutters, the angular advance of whose cutting edges is considerably less on the one hand or considerably greater on the other than 65°. But I do not wish the invention to be understood to be limited absolutely to an angular advance of 65°, for I have found by actual trial and experiment that this angle may be varied to a certain extent and still retain essentially all of the advantages of this ideal arrangement of 65°. Therefore at 4, Fig. 1, is indicated in dotted line an arrangement of the cutting edge in which the angular advance or angle of the edge to the axis is 60°, and by reference numeral 5 on the same figure of the drawing is indicated in dotted outline an arrangement of the cutting edge at an angle of 70° to the axis of the cutter. Within the limits 60° to 70° essentially all of the advantages of the cutter which have been heretofore described are secured practically in full.

It is also to be understood, however, that the invention contemplates a variation in the angle of the edge to the axis of the cutter of somewhat more than 5° either way, though I emphasize the variation of 5° because it is found that in every case the angular advance within the limits 60° to 70° will practically produce all the results sought.

While this invention is concerned primarily with the peculiar arrangement of the cutting spiral edges of the cutter, I have shown to the right of Fig. 1, intermediate cutting members 6 and have also shown the ends of the cutting edges 2 arranged parallel with the axis as at 7 in order to produce a right angled cut in the face of the work where required. This, however, constitutes one of the features of my application Serial No. 830,879, filed April 10, 1914. This feature is here shown however, to indicate a completed tool.

While I have herein shown a preferred embodiment of my invention, it is to be understood that the same is not limited to the precise details herein shown, but the invention may be modified within the scope of the appended claims.

What I claim is:

1. A rotary cutter, the angular advance of whose cutting edge is substantially 65°.

2. A rotary cutter the angular advance of whose cutting edge is within the limits of from 55° to 75° to the axis.

In testimony whereof I, the said JOHN M. RICHARDS, have hereunto set my hand.

JOHN M. RICHARDS.

Witnesses:
 JOHN F. WILL,
 IRENE F. GEYER.